United States Patent

Amori

[15] 3,688,826
[45] Sept. 5, 1972

[54] FRUIT CUTTING AND DE-PITTING SYSTEM

[72] Inventor: Joseph A. Amori, 1270 Pine Ave., San Jose, Calif. 95125

[22] Filed: Dec. 7, 1970

[21] Appl. No.: 95,581

[52] U.S. Cl. .................146/17 R, 146/73, 146/28 R
[51] Int. Cl. ...............................................A23n 3/08
[58] Field of Search.........146/17 R, 17 A, 28 R, 237, 146/238, 73

[56] References Cited

UNITED STATES PATENTS

| | | | |
|---|---|---|---|
| 2,827,089 | 3/1958 | Amori | 146/73 |
| 3,273,616 | 9/1966 | Petersen | 146/28 R |

*Primary Examiner*—Willie G. Abercrombie
*Attorney*—Naylor & Neal

[57] ABSTRACT

Apparatus for cutting and removing the pit from ovaloid fruit comprising means for transporting the fruit in a serial fashion along a predetermined path while continuously rotating the fruit in a substantially vertical plane and a freely suspended rotatable knife disposed above the predetermined path and adapted to serially engage the fruit. The knife includes a flat plate having first tooth means comprising a plurality of teeth disposed about the periphery thereof and projecting inwardly a distance sufficient to pierce the skin of the engaged fruit and cut the fruit but insufficient to normally engage the fruit pit. Also disposed about the periphery of the flat plate is second tooth means and sufficient to engage the pit and remove the pit from the fruit.

3 Claims, 6 Drawing Figures

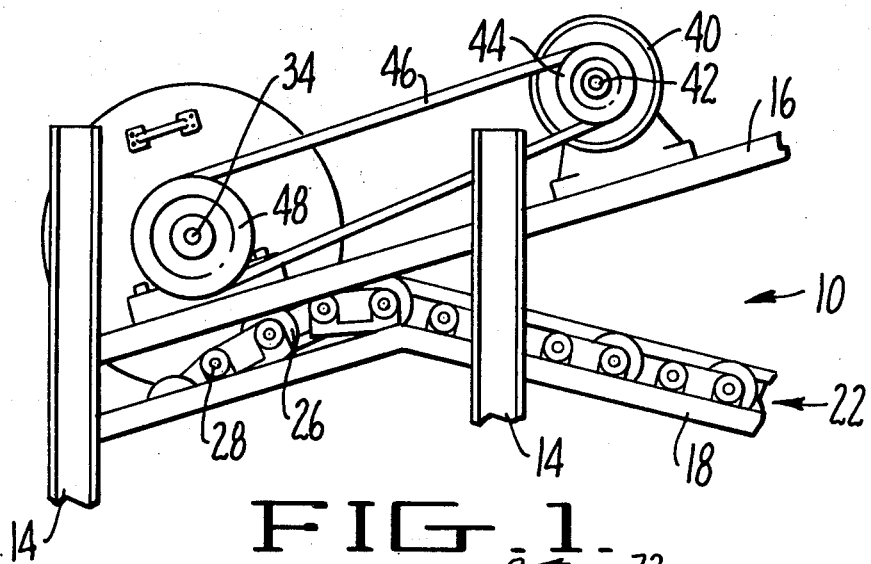
FIG. 1.
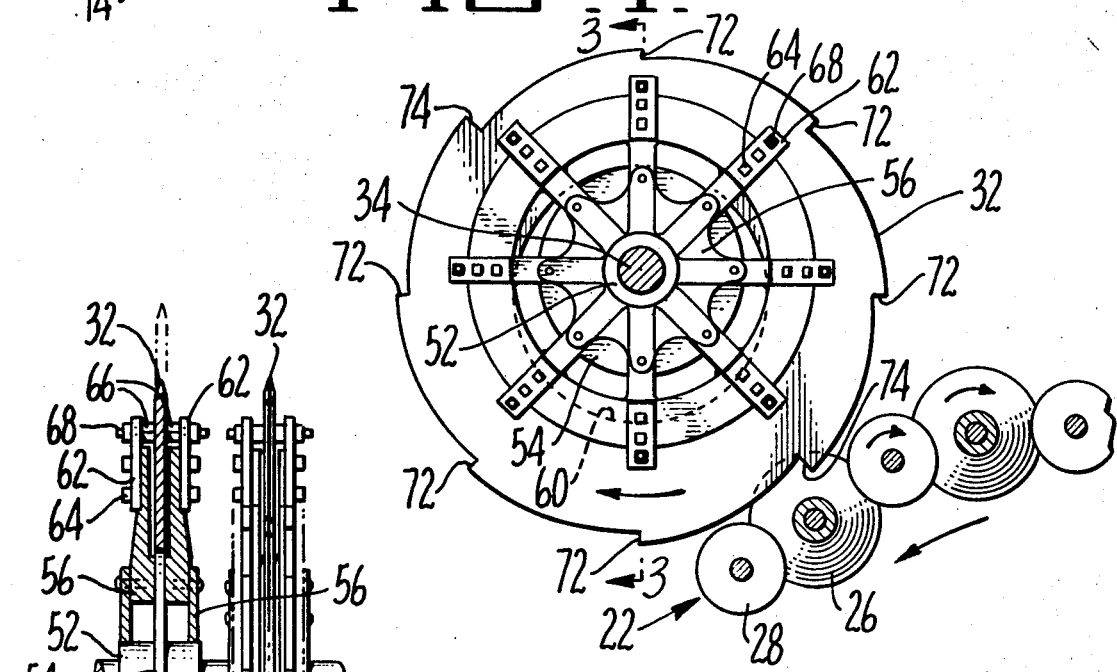
FIG. 2.
FIG. 3.
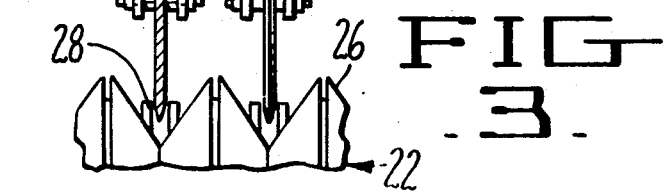

INVENTOR.
JOSEPH A. AMORI
BY Naylor & Neal
ATTORNEYS 3,688,826

FRUIT CUTTING AND DE-PITTING SYSTEM

BACKGROUND OF THE INVENTION

The present invention relates to the art of fruit handling, and more particularly, to apparatus for cutting ovaloid fruit, such as plums, and removing the pits therefrom.

It is well-known in the prior art to provide means whereby ovaloid fruits, such as plums and the like, are cut in half and de-pitted. However, such prior art approaches are characterized by their complexity and inability to either effectively remove the fruit pits or to effect such removal only with concurrent ripping or tearing of the fruit. This latter side-effect is particularly undesirable since it provides the processed fruit with an unaesthetic appearance and results in the loss of some of the desirable portions of the fruit along with the removed pit.

SUMMARY OF THE INVENTION

It is therefore an object of the present invention to provide a fruit cutting and de-pitting system which is simple and inexpensive in construction yet provides for the rapid and efficient removal of pits from ovaloid fruit.

It is a further object of the present invention to provide a system for cutting and de-pitting fruit wherein such de-pitting is accomplished without undue mutilation of the fruit.

The above-noted and other objects have been attained in accordance with the teachings of the present invention by providing apparatus for cutting and removing the pit from ovaloid fruit comprising means for transporting the fruit in a serial fashion along a predetermined path and continuously rotating the fruit in a substantially vertical plane as it is moved along said predetermined path. In addition, a freely suspended rotatable knife is disposed above the predetermined path which is adapted to serially engage the fruit. The knife includes a flat plate having first tooth means comprising a plurality of teeth disposed about the periphery thereof and projecting inwardly a distance sufficient to pierce the skin of the engaged fruit and cut the fruit by insufficient to normally engage the fruit pit. In addition, second tooth means is provided comprising at least one tooth projecting inwardly a distance greater than the projected distance of said first tooth means and sufficient to engage the pit and remove the pit from the remainder of the fruit. In the vicinity of the knife, the predetermined path is generally in a downward direction and the knife is rotated in a predetermined direction opposite to the rotatable motion of the fruit during transport thereof.

DESCRIPTION OF THE DRAWINGS

The above-noted and other objects of this invention will be understood from the following description taken with reference to the drawings wherein:

FIG. 1 is a detailed view in side elevation illustrating a portion of a fruit handling machine incorporating the teachings of the present invention, and more particularly, illustrating details of fruit transport means and a rotary knife for removing the pit from ovaloid fruit;

FIG. 2 is a detailed view in side elevation of a rotary knife constructed in accordance with the teachings of the present invention and showing the relationship of same to an associated fruit conveyor or transport means;

FIG. 3 is an enlarged view in section taken along lines 3—3 of FIG. 2; and

DESCRIPTION OF THE ILLUSTRATED EMBODIMENT

Figure 4A:
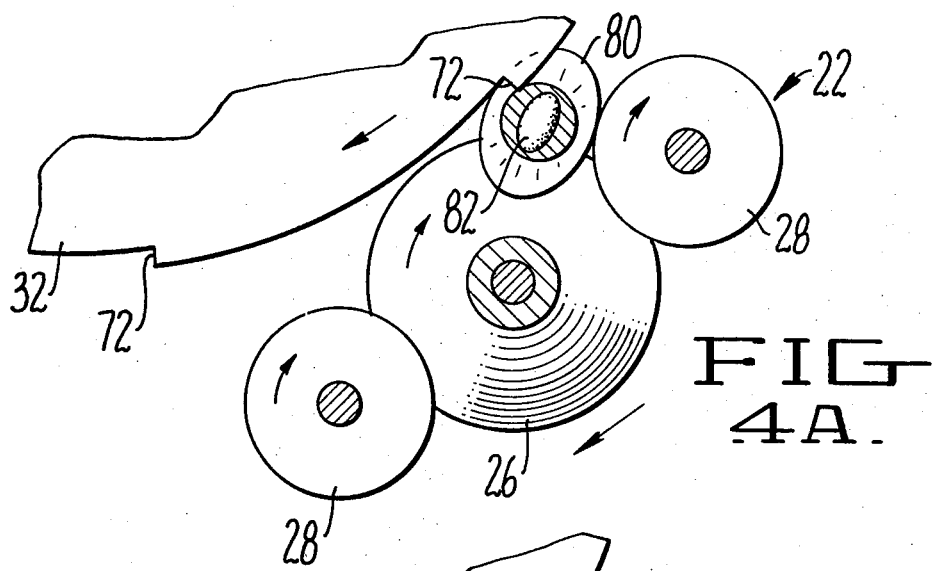
FIGS. 4A, 4B and 4C are enlarged side views illustrating schematically the interrelationship between a rotary knife and fruit transport means constructed in accordance with the teachings of the present invention while same are being utilized to cut and de-pit an ovaloid fruit.

The present invention is adapted for use in a fruit handling machine of the type shown, for example, in my U.S. Pat. No. 2,827,089, issued Mar. 18, 1958 and entitled FRUIT ORIENTING AND CUTTING SYSTEM. In that patent an arrangement is disclosed whereby fruit is received from a conveyor and delivered in ordered sequence at a predetermined locus. A conveyor then picks up the fruit at said predetermined locus and positionally orients the fruit. The conveyor delivers the fruit to a fruit cutting system comprising vertically disposed annular knives beneath which the fruit is brought, said knives being adapted to slicingly engage the fruit about the periphery thereof. The present invention in effect provides an improvement over this last described portion of the fruit handling machine and, in particular, provides an arrangement whereby the cutting and de-pitting of ovaloid fruits such as plums are accomplished.

Referring now to FIG. 1 the fruit cutting and de-pitting section of a fruit handling machine of a general type shown in aforementioned U.S. Pat. No. 2,827,089, is designated generally by means of reference numeral 10. The section includes a supporting framework comprising vertical frame members 14 having secured thereto an upper cross frame member 16 and a lower cross frame member 18. Disposed adjacent to lower cross frame member 18 and movable relative thereto is fruit transport means in the form of a conveyor 22 only a portion of which is illustrated. Except for the path of movement defined thereby conveyor 22 is preferably of the fruit conveying and orienting type disclosed in my aforesaid U.S. Pat. No. 2,827,089. Accordingly, such conveyor will not be described in detail and reference may be had to that patent for a more detailed description thereof. For the purposes of understanding the present invention, it is only necessary at this juncture to know that the conveyor 22 is provided with means for not only transporting the fruit along the path defined by the conveyor but also for imparting rotational movement to the fruit during such transport. More particularly, the conveyor includes a plurality of conical roller elements 26 and a plurality of cylindrical roller elements 28 which cooperate therewith to impart rotational movement to the fruit as the conveyor moves along. Again, U.S. Pat. No. 2,827,089 may be referred to for details of this construction.

Referring now to FIGS. 1–3, a plurality of knives 32 are mounted on a shaft 34 which is mounted for rotation on upper cross frame member 16. Also mounted on frame member 16 is a motor 40 provided with an output shaft 42 having a sheave 44 in driving relation to a belt 46 which passes over sheave 48 carried by shaft 34. There is one knife for each row of fruit pockets within conveyor 22. The knives 32 are driven in a clockwise direction (FIGS. 1 and 2) while the fruit are being rotated in a counterclockwise direction as they are brought into engagement with the knives. Thus, at the points of engagements between the knives and the fruit both are moving in the same direction. Conveyor 22 moves toward the left as shown in FIGS. 1 and 2.

The preferred form of the knives is shown in FIGS. 2 and 3. The knife shaft 34 is provided with a plurality of fixed hubs 52. Secured to the hubs 52 is an annularly shaped disc-like knife hub 54 and a pair of annular plate members 56 in embracing relation to the knife hub 54. Mounted on the hub 54 between plates 56 serving as guide members is the annular knife blade 32. The knife blade 32 has a centrally disposed aperture 60 having a diameter which is in substantial excess of the diameter of knive hub 54. As indicated in FIG. 3, when the knife blade is suspended from the hub 54, the lower side of the blade aperture 60 is about at a level with the lowermost portions of the plates 56. The space between the knife blade 32 and the knife hub 54 at the underside of the knife assembly enables either swinging movement or upward vertical movement of the knife when it encounters some obstruction in the cutting operation.

The knife assembly is preferably provided with means to prevent lateral wobble of the knife blade during the rotation and maintain it out of engagement with the guide plates 56, said means comprising a plurality of radially disposed pairs of arms 62 secured by studs 64 to the outer sides of plates 56. The arms 62 extend outwardly beyond the edges of plates 56, and each arm is provided at its outer end with a steel bolt 66 secured to the arm by a nut 68. The heads of the bolts 66 constitute bearing means for the knife blade 32 to maintain the knife blade at all times in the vertical plane.

As may more clearly be seen with reference to FIG. 2, each knife blade has provided about the periphery thereof a plurality of inwardly projecting teeth. The majority of the teeth on the blade, i.e., teeth 72, are dimensioned so as to pierce the skin of the engaged fruit and cut same but not normally engage the fruit pit. In addition to teeth 72, each of the knives 32 is provided with substantially larger, i.e., inwardly projecting to a greater degree, teeth 74 which are disposed 180° apart. Teeth 74 are dimensioned so as to normally engage the pit of the fruit; i.e., teeth 74 project more deeply into the fruit as they pass under the knife than do relatively small teeth 72.

Figure 4B:
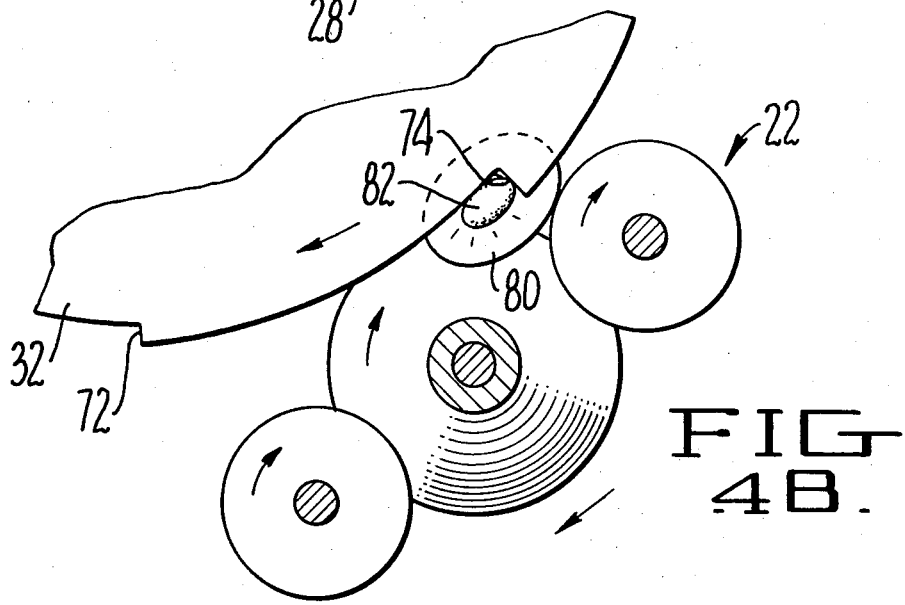
Figure 4C:
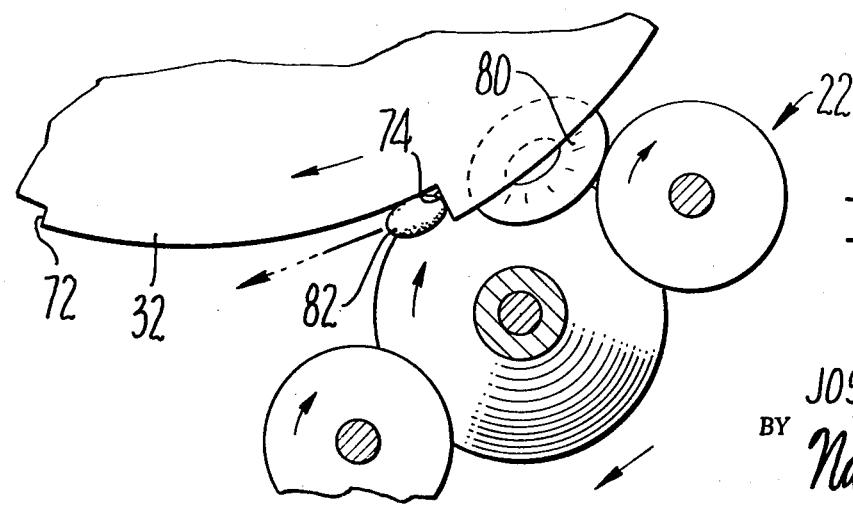

The operation of the disclosed apparatus constructed in accordance with the teachings of the present invention may most clearly be seen with reference to FIGS. 4A–4C wherein a fruit to be cut and de-pitted is shown at varying stages during the operation of the apparatus according to the present invention. In FIG. 4A the fruit, which is designated by means of reference numeral 80, is shown in the initial stages of the operation. As previously stated, the fruit 80 is rotating counterclockwise as it reaches the vicinity of knife 32. Since the knife is moving in a clockwise direction, this means that the surface of the fruit being engaged by the knife is moving in the same direction as the teeth which cut into the fruit. Due to the fact that there are more shallow teeth 72 than deep teeth 74, the odds are that the fruit 80 will initially be engaged by one of the shallow teeth. As may be seen in FIG. 4A the shallow tooth which initially engages the fruit pierces the skin and cuts the fruit but does not engage the fruit pit. Since the fruit 80 is continually rotating after an engagement with the knife 32, a cut line will be formed by one or more of the teeth 72 about the periphery of the fruit as is progresses along. The rotational speed of the knife 32 is such that one of the deep teeth 74 will engage the fruit at some point as the fruit passes between the knife and the transport means. What happens then can most clearly be seen with reference to FIGS. 4B and 4C. The tooth 74 is adapted to engage the pit 82 of the fruit, generally after a peripheral cut has been formed about the fruit, and force the pit 82 to the left and away from the remainder of the fruit, as shown in FIG. 4C. The remainder of the fruit, which is now essentially halved, continues downwardly on the conveyor 22 to any desired locus for subsequent operations.

It should be pointed out that FIGS. 4A–4C illustrate more-or-less what may be ideally accomplished with the present arrangement. Given the random operation of the knife with respect to the conveyor, however, it is to be understood that occasionally one of the large teeth 74 will engage the fruit during an early stage of its passage between the blade and the conveyor. When this occurs there may be some slight mutilation of the fruit as the pit is extracted therefrom. However, with the present arrangement such damages may be held to a minimum by carefully monitoring the draw-through speeds of the knife, the conveyor, and the rotational movement of the fruit during the operation. In any event, it has been found that the instant arrangement provides an inexpensive and efficient means whereby fruit may be cut and de-pitted.

The outer diameter of teeth 72 and 74 are the same, the teeth 74 being deeper because they extend radially inwardly to a greater degree than teeth 72.

While a preferred embodiment of the fruit pitting machine of the invention has been illustrated and described, it is to be understood that modifications may be made thereto without departing from the invention or the scope of the subjoined claims.

I claim as my invention:

1. Apparatus for cutting and removing the pits from ovaloid fruit comprising means for transporting said fruit in a serial fashion along a predetermined path and continuously rotating said fruit in a substantially vertical plane as it is moved along said path, and a freely suspended rotatable knife disposed above said path and adapted to serially engage said fruit, said knife including a plate having a plurality of peripheral teeth of substantially similar design formed at the juncture of arcuately and radially extending surfaces, the radially extending surfaces of the majority of said teeth extending inwardly a distance sufficient to pierce the skin of the engaged fruit and cut the meat of the fruit but insufficient to normally engage the fruit pit, at least one of said teeth having a radially extending surface which extends inwardly a distance greater than the radially extending surfaces of the other teeth and sufficient to engage said pit and remove the same from the remainder of said fruit.

2. The apparatus according to claim 1 wherein said means for transporting said fruit has a configuration such that the predetermined path is generally in a downward direction at least at the location where said pit is engaged and removed.

3. The apparatus according to claim 1 additionally comprising means for rotating said knife in a predetermined direction opposite to the rotatable motion of said fruit during transport.

* * * * *